US011371947B2

(12) United States Patent
Marzorati et al.

(10) Patent No.: US 11,371,947 B2
(45) Date of Patent: Jun. 28, 2022

(54) GENERATING A HOLOGRAPHIC IMAGE TO VISUALIZE CONTAMINANTS

(71) Applicant: Kyndryl, Inc., New York, NY (US)

(72) Inventors: Mauro Marzorati, Lutz, FL (US); Gary Francis Diamanti, Wake Forest, NC (US); Jeremy R. Fox, Georgetown, TX (US); Sarbajit K. Rakshit, Kolkata (IN)

(73) Assignee: Kyndryl, Inc., New York, NY (US)

( * ) Notice: Subject to any disclaimer, the term of this patent is extended or adjusted under 35 U.S.C. 154(b) by 0 days.

(21) Appl. No.: 17/102,556

(22) Filed: Nov. 24, 2020

(65) Prior Publication Data

US 2022/0163459 A1 May 26, 2022

(51) Int. Cl.
*G01N 21/94* (2006.01)
*G01N 21/88* (2006.01)

(52) U.S. Cl.
CPC ......... *G01N 21/94* (2013.01); *G01N 21/8851* (2013.01)

(58) Field of Classification Search
CPC .......................... G01N 21/94; G01N 21/8851
See application file for complete search history.

(56) References Cited

U.S. PATENT DOCUMENTS

| 10,667,659 | B2 | 6/2020 | Jung | |
|---|---|---|---|---|
| 2007/0257806 | A1* | 11/2007 | Madden | G01N 33/18 340/603 |
| 2014/0271432 | A1* | 9/2014 | Witt | B01D 12/00 423/220 |

(Continued)

FOREIGN PATENT DOCUMENTS

| KR | 100621247 B1 | 9/2006 |
|---|---|---|
| KR | 101785357 B1 | 10/2017 |

(Continued)

OTHER PUBLICATIONS

Phillips et al., "Holographic characterization of contaminants in water: Differentiation of suspended particles in heterogeneous dispersions," Water Research, vol. 122, Oct. 2017, pp. 431-439. https://www.sciencedirect.com/science/article/pii/S0043135417304803?via%3Dihub.

(Continued)

*Primary Examiner* — Jamil Ahmed
(74) *Attorney, Agent, or Firm* — Yee & Associates, P.C.

(57) ABSTRACT

Visualizing a contaminant is provided. A contaminant of a plurality of different contaminants included in a contaminant knowledgebase is identified based on analysis of contaminant-relevant data received from one or more sensors of a plurality of different sensor arrays regarding an enclosed physical space. A concentration and a type of the contaminant is identified based on the contaminant-relevant data and information included in the contaminant knowledgebase. A location of the contaminant is identified within the enclosed physical space based on location of the one or more sensors that obtained the contaminant-relevant data and a digital twin of the enclosed physical space. A visualization of the contaminant is projected at an area proximate to the location of the contaminant using a holographic image indicating the concentration and the type of the contaminant within the enclosed physical space.

20 Claims, 6 Drawing Sheets

(56) References Cited

U.S. PATENT DOCUMENTS

2018/0252628 A1* 9/2018 Ruffner .............. G01N 15/1459
2020/0238786 A1* 7/2020 Murphy ................. B60H 1/008

FOREIGN PATENT DOCUMENTS

RU          2722066 C2      5/2020
WO      WO-2020106036 A1 *  5/2020    ......... G01N 15/1434

OTHER PUBLICATIONS

Pietsch, "An alarming simulation shows how a single cough could spread particles through a grocery store. And it's a perfect example of why people should wear masks in public to combat the spread of coronavirus.," Business Insider, Apr. 14, 2020, accessed Oct. 7, 2020, 9 pages. https://www.businessinsider.com/how-coughing-could-spread-particles-grocery-store-without-mask-model-2020-4.

Lahiri et al., "Detection of pathogenic gram negative bacteria using inftared thermography," Infrared Physics & Technology, vol. 55, Issue 6, Nov. 2012, pp. 485-490.

"Thermal Imaging of Bacterial Cells," Wiley Analytical Science, Mar. 14, 2014, 4 pages https://analyticalscience.wiley.com/do/10.1002/imaging.4205/full/.

McDonald, "New Technique Generates Free-Floating 3D Images. Just Don't Call It a Hologram," Seeker, Group Nine Media Inc., accessed Oct. 9, 2020, 7 pages. https://www.seeker.com/gadgets/new-technique-generates-free-floating-3d-images-just-dont-call-it-a-hologram.

Smalley et al., "A photophoretic-Trap volumetric display," Nature 553, Jan. 25, 2018, pp. 486-490; Abstract Only, 10 pages.

\* cited by examiner

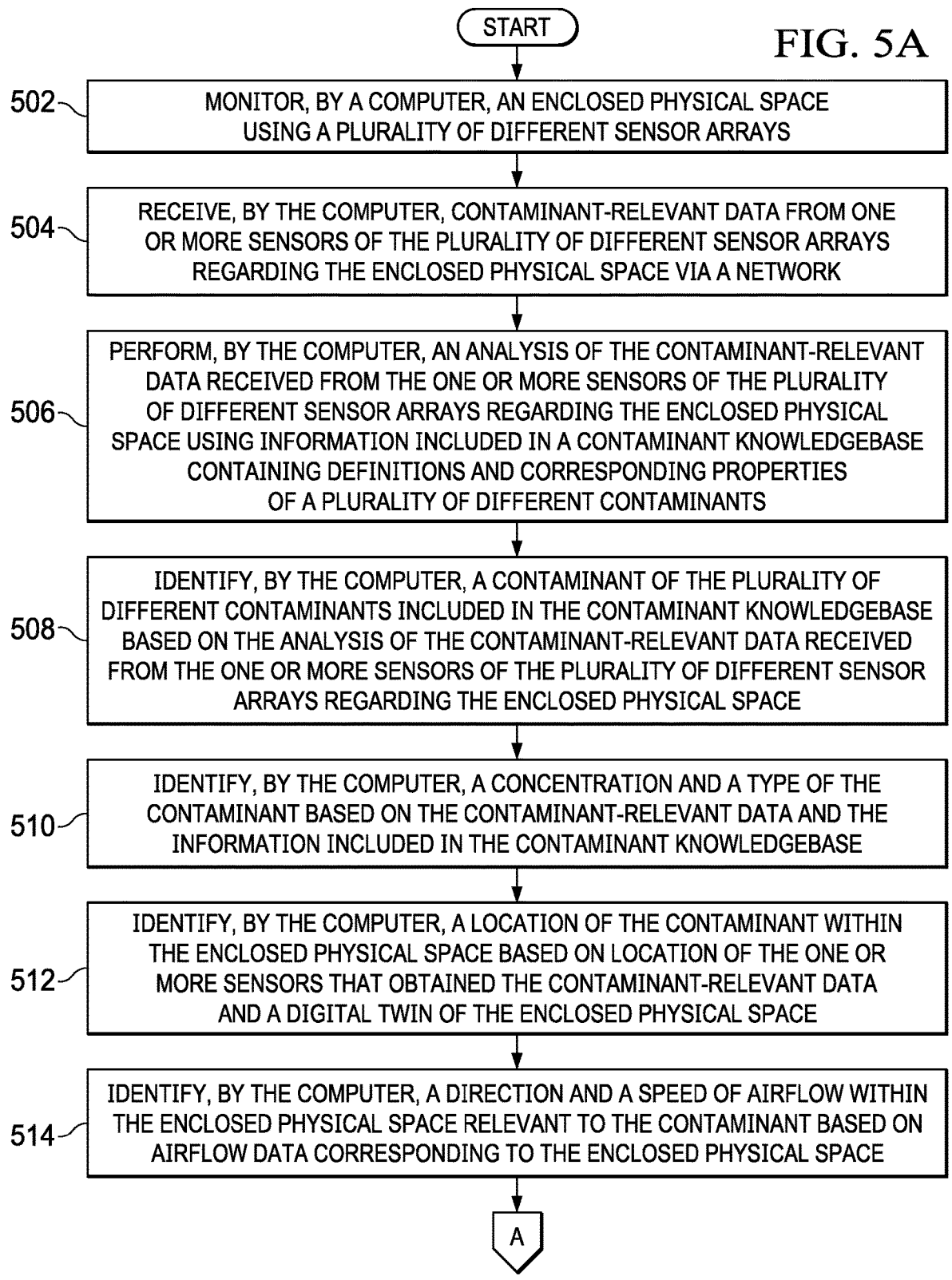

GENERATING A HOLOGRAPHIC IMAGE TO VISUALIZE CONTAMINANTS

BACKGROUND

1. Field

The disclosure relates generally to holograms and more specifically to generating a holographic image of contaminants in an enclosed physical space to visualize the contaminants, along with a type, concentration, and movement of the contaminants.

2. Description of the Related Art

A hologram is a three-dimensional image formed by the interference of light beams from a laser or other coherent light source. The hologram is a recording or a photograph of an interference pattern which, when suitably illuminated, produces the three-dimensional image. In other words, the hologram is a real world recording of the interference pattern that uses diffraction to reproduce the three-dimensional light field, resulting in an image which has the depth, parallax, and other properties of the original scene. Thus, the hologram is a recording of a light field, rather than an image formed by a lens.

The holographic image produced by holographic techniques is usually unintelligible when viewed under diffuse ambient light. When suitably lit by a laser or other coherent light source, the interference pattern diffracts the light into an accurate reproduction of the original light field, and the objects that were in the original light field exhibit visual depth cues, such as parallax and perspective that change realistically with the different angles of viewing. That is, the view of the image from different angles represents the original scene viewed from similar angles. In this sense, the hologram does not have just the illusion of depth, but is truly a three-dimensional image. Holographic techniques can also reproduce microscopic level of detail throughout a recorded scene.

SUMMARY

According to one illustrative embodiment, a computer-implemented method for visualizing a contaminant is provided. A computer identifies a contaminant of a plurality of different contaminants included in a contaminant knowledgebase based on analysis of contaminant-relevant data received from one or more sensors of a plurality of different sensor arrays regarding an enclosed physical space. The computer identifies a concentration and a type of the contaminant based on the contaminant-relevant data and information included in the contaminant knowledgebase. The computer identifies a location of the contaminant within the enclosed physical space based on location of the one or more sensors that obtained the contaminant-relevant data and a digital twin of the enclosed physical space. The computer projects a visualization of the contaminant at an area proximate to the location of the contaminant using a holographic image indicating the concentration and the type of the contaminant within the enclosed physical space. According to other illustrative embodiments, a computer system and computer program product for visualizing a contaminant are provided.

BRIEF DESCRIPTION OF THE DRAWINGS

FIGS. 5A-5B are a flowchart illustrating a process for visualizing a contaminant in accordance with an illustrative embodiment.

DETAILED DESCRIPTION

Figure 1:
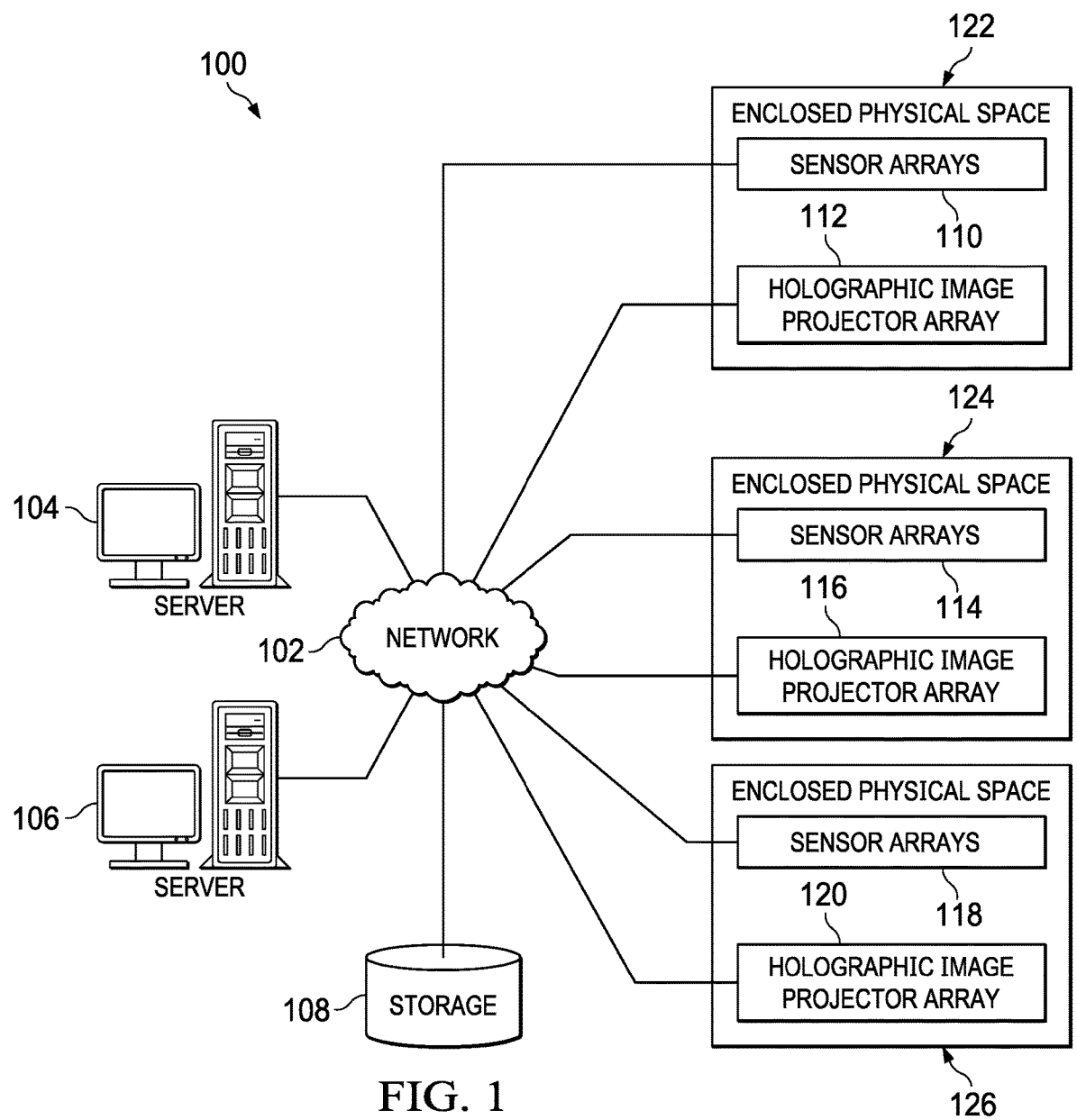
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
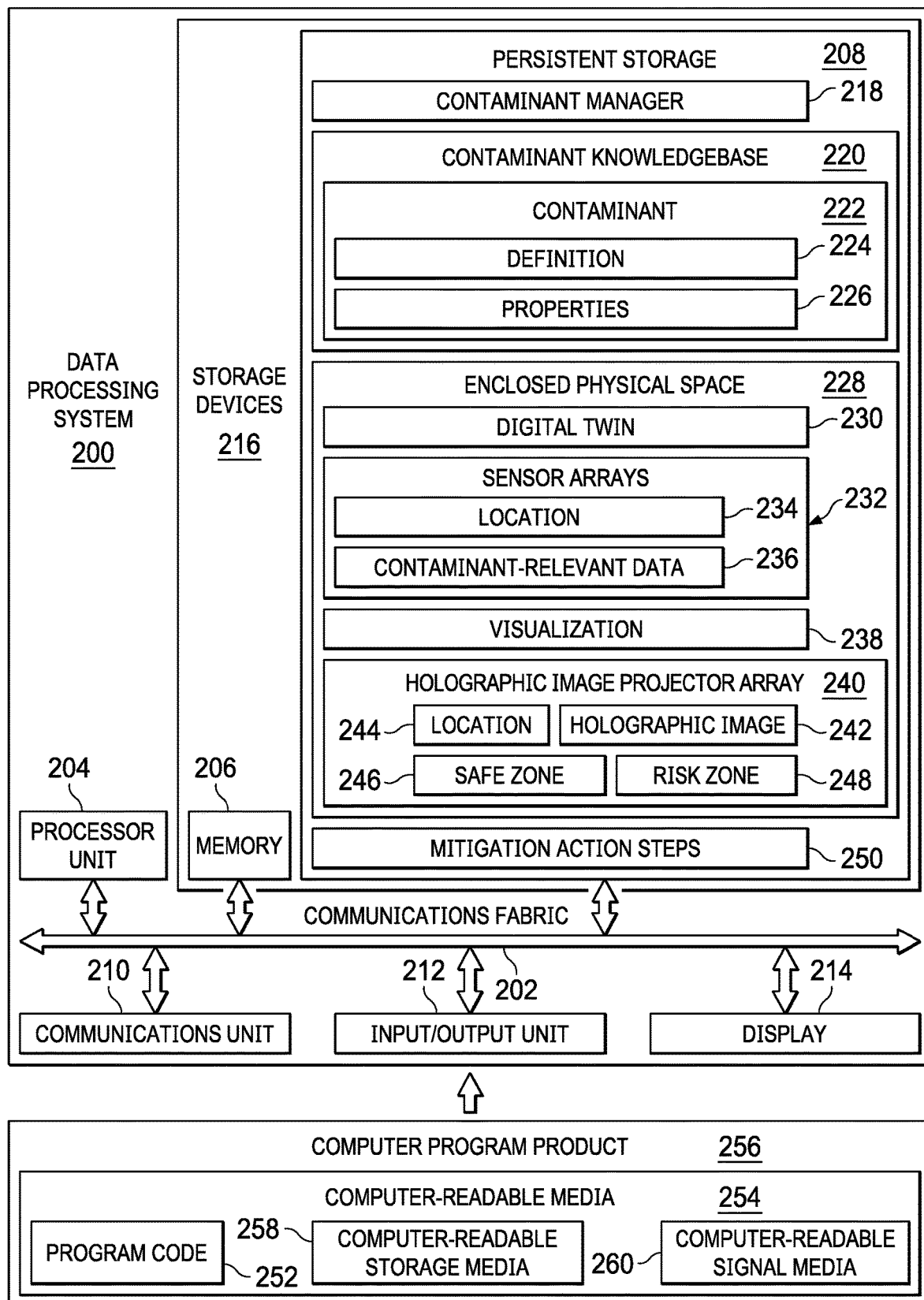
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, sensors, holographic image projectors, and other devices in which the illustrative embodiments may be implemented. Network data processing system 100 contains network 102, which is the medium used to provide communications links between the computers, data processing systems, sensors, holographic image projectors, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. In addition, server 104 and server 106 provide contaminant management services to subscribing customers, such as, for example, stores, businesses, companies, corporations, enterprises, organizations, agencies, institutions, individuals, and the like. Contaminants may include, for example, any type of microscopic or unseen dust, particulates, allergens, pathogens, toxic materials (e.g., chemicals, pesticides, herbicides, petroleum products, and the like), or any combination thereof.

Also, it should be noted that server 104 and server 106 may each represent a cluster of servers in one or more data centers. Alternatively, server 104 and server 106 may each represent multiple computing nodes in one or more cloud environments. Further, server 104 and server 106 may provide information, such as, for example, applications, programs, updates, fixes, files, data, and the like to registered client devices.

Sensor arrays 110, holographic image projector array 112, sensor arrays 114, holographic image projector array 116, sensor arrays 118, and holographic image projector array 120 also connect to network 102. Sensor arrays 110, holographic image projector array 112, sensor arrays 114, holographic image projector array 116, sensor arrays 118, and holographic image projector array 120 are registered client devices of server 104 and server 106. Sensor arrays 110, holographic image projector array 112, sensor arrays 114, holographic image projector array 116, sensor arrays 118, and holographic image projector array 120 may utilize wire and wireless communication links to network 102 to send data to and receive data and instructions from server 104 and server 106.

In this example, sensor arrays 110 and holographic image projector array 112 are located in enclosed physical space 122, sensor arrays 114 and holographic image projector array 116 are located in enclosed physical space 124, and sensor arrays 118 and holographic image projector array 120 are located in enclosed physical space 126. Enclosed physical space 122, enclosed physical space 124, and enclosed physical space 126 may represent any type of enclosed physical space, such as, for example, a room, store, office space, office building, restaurant, theater, museum, bank, laboratory, research facility, educational facility, healthcare facility, nuclear facility, or the like, which is owned and operated by a subscribing customer to the contaminant services provided by server 104 and server 106.

Each of sensor arrays 110, sensor arrays 114, and sensor arrays 118 represent a plurality of different types of sensor arrays. A sensor array is a group of similar sensors, deployed in a geometric pattern, used for collecting and processing a particular type of data. The plurality of different types of sensor arrays may include, for example, an imaging sensor array, such as video cameras, still picture cameras, infrared cameras, and the like, a sound sensor array, a motion sensor array, a thermal sensor array, an air quality sensor array, an airflow sensor array, a dust sensor array, a pathogen sensor array, a liquid sensor array, a vapor sensor array, an odor sensor array, and the like. Server 104 and server 106 utilize sensor arrays 110, sensor arrays 114, and sensor arrays 118 to monitor the environment and detect contaminants within enclosed physical space 122, enclosed physical space 124, and enclosed physical space 126, respectively, by collecting contaminant-relevant data corresponding to enclosed physical space 122, enclosed physical space 124, and enclosed physical space 126.

Server 104 and server 106 analyze the contaminant-relevant data received from sensor arrays 110, sensor arrays 114, and sensor arrays 118 using information stored in a contaminant knowledgebase that contains definitions and properties of a plurality of different contaminants to determine whether one or more contaminants are located within enclosed physical space 122, enclosed physical space 124, or enclosed physical space 126. In response to server 104 or server 106 determining that one or more contaminants exist in enclosed physical space 122, enclosed physical space 124, or enclosed physical space 126, server 104 or server 106 utilize holographic image projector array 112, holographic image projector array 116, or holographic image projector array 120, of a corresponding enclosed physical space containing the one or more contaminants, to project a holographic image or a volumetric projection of the one or more contaminants for people to visualize the one or more contaminants to prevent exposure. A holographic image projector array is a group of holographic or volumetric image projectors, deployed in a geometric pattern, used to project a holographic or volumetric image of the one or more contaminants for visualization by people.

Storage 108 is a network storage device capable of storing any type of data in a structured format or an unstructured format. In addition, storage 108 may represent a plurality of network storage devices. Further, storage 108 may represent a contaminant knowledgebase or contaminant knowledge corpus that store identifiers, definitions, and descriptions for a plurality of different types of contaminants. Furthermore, storage 108 may store other types of information, such as, for example, digital twins of enclosed physical space 122, enclosed physical space 124, and enclosed physical space 126; identifiers and network addresses of sensor arrays 110, holographic image projector array 112, sensor arrays 114, holographic image projector array 116, sensor arrays 118, and holographic image projector array 120; defined contaminant event triggers; contaminant mitigation action steps; and the like.

In addition, it should be noted that network data processing system 100 may include any number of additional servers, sensors, projectors, enclosed physical spaces, storage devices, and other devices not shown. Program code located in network data processing system 100 may be stored on a computer readable storage medium and downloaded to a computer or other data processing device for use. For example, program code may be stored on a computer readable storage medium on server 104 and downloaded to sensor array 110 and holographic image projector array 112 over network 102 for use on sensor array 110 and holographic image projector array 112.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as server 104 in FIG. 1, in which computer readable program code or instructions implementing contaminant management processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer readable storage device or a computer readable storage medium is any piece of hardware that is capable of storing information, such as, for example, without limitation, data, computer readable program code in functional form, and/or other suitable information either on a transient basis or a persistent basis. Further, a computer readable storage device or a computer readable storage medium excludes a propagation medium, such as transitory signals. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores contaminant manager 218. However, it should be noted that even though contaminant manager 218 is illustrated as residing in persistent storage 208, in an alternative illustrative embodiment contaminant manager 218 may be a separate component of data processing system 200. For example, contaminant manager 218 may be a hardware component coupled to communication fabric 202 or a combination of hardware and software components. In another alternative illustrative embodiment, a first set of components of contaminant manager 218 may be located in data processing system 200 and a second set of components of contaminant manager 218 may be located in a second data processing system, such as, for example, server 106 in FIG. 1.

Contaminant manager 218 controls the process of identifying certain contaminants within an enclosed physical space and generating a holographic image of identified contaminants at a location above, proximate to, or near the identified contaminants within the enclosed physical space for visualization by people within the enclosed physical space of the identified contaminants, along with type, concentration, and movement of the contaminants. Contaminant knowledgebase 220 represents a database of a plurality of different contaminants. Contaminant manager 218 may generate contaminant knowledgebase 220 by retrieving contaminant information from a plurality of online contaminant databases via a network, such as, for example, network 102 in FIG. 1, and/or receiving inputs from a set of contaminant subject matter experts.

In this example, contaminant knowledgebase 220 stores information regarding contaminant 222. Contaminant 222 may be, for example, dust, allergen, pathogen, or other particulate. The dust may be any type of dust, such as, for example, dead skin cells, pet dander, insect fragments, textile fibers, paper fibers, powder, soil, or the like. The allergen may be any type of allergen, such as, for example, plant pollen, mold, or the like. The pathogen may be any type of pathogen, such as, for example, a virus, bacterium, fungus, protozoa, parasite, or the like. The particulate may be any type of particulate, such as, for example, industrial soot, wildfire ash, volcanic ash, radioactive particles, coal dust, asbestos fibers, or the like.

Contaminant knowledgebase 220 also stores definition 224 and properties 226 of contaminant 222. Definition 224 identifies and classifies contaminant 222. Properties 226 describe qualities, aspects, or characteristics of contaminant 222, such as type of contaminant 222, virulence of contaminant 222, severity of reaction to exposure to contaminant 222, movement patterns of contaminant 222, toxicity of contaminant 222, acceptable or safe levels of contaminant 222, acceptable or safe distances from contaminant 222, and the like. Of course, it should be noted that contaminant 222 represents only one of the plurality of different contaminant descriptions stored in contaminant knowledgebase 220. Contaminant manager 218 utilizes the information stored in contaminant knowledgebase 220 to identify detected contaminants within enclosed physical space 228. Enclosed physical space 228 represents an identifier of a particular enclosed physical space, such as, for example, enclosed physical space 122 in FIG. 1. However, it should be noted that enclosed physical space 228 may represent identifiers for a plurality of different enclosed physical spaces.

Contaminant manager 218 generates digital twin 230 of enclosed physical space 228. Digital twin 230 is a virtual representation (e.g., virtual three-dimensional model) of enclosed physical space 228 based on real time sensor data received from one or more sensors in sensor arrays 232. Contaminant manager 218 uses digital twin 230 to help identify the particular location of contaminant 222 within enclosed physical space 228.

Sensor arrays 232 represent identifiers for a plurality of different sensor arrays arranged in geometric patterns within enclosed physical space 228. Sensor arrays 232 may include, for example, imaging sensors, sound sensors, motion sensors, thermal sensors, odor sensors, dust sensors, pathogen sensors, allergen sensors, particulate sensors, radiation sensors, and the like. Location 234 represents identification of a defined location for each and every sensor in sensor arrays 232. Contaminant manager 218 also uses location 234 of each sensor that detected contaminant-relevant data 236 corresponding to contaminant 222 to determine the location of contaminant 222 within enclosed physical space 228. Contaminant-relevant data 236 represents any information obtained by one or more sensors in sensor arrays 232 that is pertinent, applicable, or related to contaminant 222 for identification of contaminant 222 by contaminant manager 218 using information contaminant knowledgebase 220, such as definition 224 and properties 226.

In response to contaminant manager 218 identifying, for example, type, concentration, and movement of contaminant 222, contaminant manager 218 generates visualization 238 of contaminant 222. Visualization 238 is a depiction or representation of contaminant 222 using one or more of a color, shape, figure, graphic, symbol, animation, or the like. For example, contaminant manager 218 may generate a magenta pyramid to represent a radioactive particle, such as Cesium 137 (i.e., contaminant 222), a multitude of magenta pyramids to represent the concentration of the radioactive particles, and an animation to represent a predicted spread or movement of the radioactive particles via airflow within enclosed physical space 228 (e.g., a nuclear power generating station, nuclear laboratory, or the like).

After generating visualization 238 of contaminant 222, contaminant manager 218 utilizes holographic image projector 240, such as, for example, holographic image projector 112 in FIG. 1, to project visualization 238 of contaminant 222 using holographic image 242 at or proximate to the identified location of contaminant 222 within enclosed physical space 228. Holographic image 242 is a three-dimensional volumetric projection of contaminant 222. Location 244 identifies a defined location of each projector in holographic image projection array 240. Contaminant manager 218 utilizes location 244, location 234, and digital twin 230 to determine which projector or set of projectors of holographic image projection array 240 to use to project holographic image 242 of contaminant 222.

Moreover, contaminant manager 218 utilizes holographic image projector array 240 to display virtual boundaries of safe zone 246 and risk zone 248 surrounding the location of contaminant 222. Safe zone 246, which is outside of risk zone 248, represents an area that is at a predefined safe distance from contaminant 222 with little to no risk of exposure to contaminant 222 by people moving within enclosed physical space 228. Risk zone 248 is an area immediately adjacent to and encircling contaminant 222 within a predefined distance from contaminant 222 that is considered a high-risk area of exposure to contaminant 222 by people moving within enclosed physical space 228.

Further, contaminant manager 218 performs mitigation action steps 250 regarding identified contaminant 222 within enclosed physical space 228 to remediate effects of contaminant 222 on people moving within enclosed physical space 228. Mitigation action steps 250 may include, for example, contaminant manager 218 automatically sending a notification to one or more individuals responsible for managing contaminates detected within enclosed physical space 228. In addition to sending notifications, contaminant manager 218, via defined application programming interfaces, can automatically connect to and control one or more systems (e.g., ventilation system, water mister or sprinkler system, and the like) of enclosed physical space 228 to at least one of isolate the identified contaminants and eliminate the identified contaminants from enclosed physical space 228.

As a result, data processing system 200 operates as a special purpose computer system in which contaminant manager 218 in data processing system 200 enables automatic identification and management of contaminants within an enclosed physical space. In particular, contaminant manager 218 transforms data processing system 200 into a special purpose computer system as compared to currently available general computer systems that do not have contaminant manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 252 is located in a functional form on computer readable media 254 that is selectively removable and may be loaded onto or transferred to data processing system 200 for running by processor unit 204. Program code 252 and computer readable media 254 form computer program product 256. In one example, computer readable media 254 may be computer readable storage media 258 or computer readable signal media 260.

In these illustrative examples, computer readable storage media 258 is a physical or tangible storage device used to store program code 252 rather than a medium that propagates or transmits program code 252. Computer readable storage media 258 may include, for example, an optical or magnetic disc that is inserted or placed into a drive or other device that is part of persistent storage 208 for transfer onto a storage device, such as a hard drive, that is part of persistent storage 208. Computer readable storage media 258 also may take the form of a persistent storage, such as a hard drive, a thumb drive, or a flash memory that is connected to data processing system 200.

Alternatively, program code 252 may be transferred to data processing system 200 using computer readable signal media 260. Computer readable signal media 260 may be, for example, a propagated data signal containing program code 252. For example, computer readable signal media 260 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer readable media 254" can be singular or plural. For example, program code 252 can be located in computer readable media 254 in the form of a single storage device or system. In another example, program code 252 can be located in computer readable media 254 that is distributed in multiple data processing systems. In other words, some instructions in program code 252 can be located in one data processing system while other instructions in program code 252 can be located in one or more other data processing systems. For example, a portion of program code 252 can be located in computer readable media 254 in a server computer while another portion of program code 252 can be located in computer readable media 254 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 252.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Illustrative embodiments take into account that while people are moving around in any enclosed physical area, such as, for example, a store, hospital, office building, school, museum, theater, restaurant, gym, room, or the like, these people may not be aware of contaminants around them, which may present a health risk to one or more people present in the area. These contaminants may be so small that the person is not be able to see the contaminants and avoid them or take protective measures. For example, dust can accumulate on store shelves and when disturbed can float in the air. Some people in the store may have dust allergies, which may cause them to sneeze, producing microscopic droplets that can be suspended in the air for a period of time. Thus, a solution is needed by which a person can visualize contaminants in any enclosed physical area so that the person can avoid the area, and at the same time, notify individuals responsible for managing the area to take appropriate cleaning measures to reduce the contaminants to acceptable levels or remove the contaminants completely.

Illustrative embodiments using sensors can detect the floating dust in the air and generate a holographic image of the floating dust so that a person with dust allergies can avoid that location. Illustrative embodiments may also detect specific germs using thermal imaging, infrared imaging, and the like. Illustrative embodiments utilize holographic or volumetric projection techniques, by which specific types of contaminants, such as dust, germs (i.e., pathogenic microorganisms, infectious agents, and the like), and other particulates, are predicted in any enclosed surrounding based on data received from different types of Internet of Things sensors and scanning devices in an enclosed physical area. Illustrative embodiments then utilize a set of one or more holographic or volumetric projectors to display appropriate holographic or volumetric images where there are projection particles, such as, for example, dust, cellulose, glass beads, tungsten, water vapor, smoke, or the like, to react against to show the presence of the contaminants and their type and concentration in the surrounding area. Illustrative embodiments may utilize, for example, a technique called photophoretic optical trapping that generates a full-color image that floats in mid-air. This photophoretic optical trapping technique does not require any projection surface or special glasses and the generated three-dimensional holographic or volumetric image can be seen from any angle.

Illustrative embodiments utilize arrays of different Internet of Things sensors, such as, for example, dust detection sensors, liquid detection sensors, vapor or droplet detection sensors, odor detection sensors, air quality detection sensors, and the like, and scanning devices, such as, for example, thermal imaging devices, infrared imaging devices, and the like, located in an enclosed physical space to detect and generate contaminant-relevant data corresponding to the enclosed physical area. Illustrative embodiments then analyze the contaminant-relevant data against a contaminant knowledgebase or knowledge corpus to predict the presence of a set of one or more specific contaminants in different places of the enclosed physical area. Afterward, illustrative embodiments project the holographic or volumetric image creating a visualization of the contaminants (e.g., dust, germs, and other similar particulates) within the enclosed physical area so that people present in the enclosed physical area can identify the exact location of the contaminants from a safe distance (i.e., prior to encountering exposure to the contaminants).

Illustrative embodiments build the contaminant knowledgebase or knowledge corpus using information obtained from a plurality of contaminant data sources that define a plurality of different specific contaminants and describe their respective properties (e.g., type, virulence, and the like). Illustrative embodiments may also utilize machine learning to understand concentration and movement of contaminants within different enclosed areas based on historical sensor data stored in the contaminant knowledgebase. Illustrative embodiments utilize the contaminant knowledgebase to classify contaminants by, for example, type, virulence, severity of exposure, air movement patterns, and the like. Based on the contaminant classification, illustrative embodiments generate a holographic or volumetric image using different colors, shapes, animations, and the like to create a visualization of the contaminant for those present in the enclosed physical area to take appropriate action (e.g., avoid the area of contaminant, put on a protective face mask, or the like).

Further, illustrative embodiments track airflow patterns within the enclosed physical space using an airflow detection sensor array within the enclosed physical area. The airflow detection sensor array is capable of determining direction and speed of the airflow within the enclosed physical area. Based on the airflow pattern (i.e., direction and speed), illustrative embodiments identify how the contaminant is spreading or moving via the airflow pattern through the enclosed physical area in real time. Illustrative embodiments then generate an appropriate holographic or volumetric three-dimensional visualization of the contaminant (e.g., color and shapes indicating a type and concentration of the contaminant and an animation indicating how the contaminant is moving via the airflow pattern) within the enclosed physical space.

Illustrative embodiments identify the exact location of the contaminant within the enclosed physical space by a server making and updating a digital twin of the enclosed physical area and identifying location of the set of one or more sensors detecting the contaminant. A digital twin is a virtual representation (e.g., virtual model) of the enclosed physical area using real time Internet of Things sensor-based data to enable understanding, learning, and reasoning.

In addition to, or instead of, projecting the holographic or volumetric image of the contaminant at a specific location within the enclosed physical area, illustrative embodiments can project the enclosed physical area environment to a subscriber user via a mobile application loaded on a mobile device, such as, a smart phone, smart watch, handheld computer (e.g., tablet computer), or the like. In this scenario, the subscriber user receives feeds corresponding to frequently visited enclosed physical areas (e.g., stores, offices, and the like) from the server to enable the subscriber user to determine the cleanliness and safety of an enclosed physical area environment prior to physically entering it. This will provide valuable information to the subscriber user in certain enclosed physical areas, such as, for example, a public transportation area of high foot traffic so the subscriber user can assess the environment before being exposed to certain contaminants identified within it.

Furthermore, illustrative embodiments utilize air quality data received from an air quality sensor array within the enclosed physical area. For example, illustrative embodiments can track and analyze results of contaminant mitigation action steps, such as, for example, air purification steps, air decontamination steps, and the like, within the enclosed physical area based the continuous air quality data received from the air quality sensor array. Based on the air quality data feeds from the air quality sensor array, illustrative embodiments continuously update the results of the contaminant mitigation action steps in real time, while continuously updating the midair three-dimensional holographic or volumetric image for visualization of the contaminant within the enclosed physical area or lack thereof.

Moreover, illustrative embodiments can use the holographic projection system to project virtual safe zone and risk zone boundaries around the identified contaminant so that people in the area can identify how much space should be maintained between them and the contaminant. For example, the safe zone can indicate that a person is at a safe distance from the contaminant and not at risk of being exposed to the contaminant, whereas the risk zone can indicate that a person is not at a safe distance and is at risk of exposure to the contaminant. Also, it should be noted that by using holographic projecting techniques, illustrative embodiments may be instrumental in containment and/or elimination of the contaminant by automatically performing a set of mitigation action steps, such as, for example, starting jets of forced columns of hot or cold air around the contaminant to isolate the contaminant and using negative airflow within the columns of air to extract the contaminant from the area. Alternatively, illustrative embodiments may utilize a water mister or sprinkler system to provide a water barrier around the contaminant to isolate the contaminant and use the ventilation system to extract the isolated contaminant.

Illustrative embodiments also utilize predefined markings and legends to identify contaminants. For example, based on the types and properties of contaminants (e.g., dust, germs, or other particulates settled on shelves or suspended in air) within the enclosed physical area, illustrative embodiments utilize predefined colors, shapes, and animation in the holographic or volumetric image to identify specific contaminants, along with type and movement, so that people in the area can identify the particular contaminant and its movement through the air. For example, illustrative embodiments may utilize a blue circle to identify dust, while using a red square to identify a particular pathogen. Further, illustrative embodiments may utilize animation to show contaminant spread or movement based on direction and speed of airflow within the enclosed physical space or utilize a bouncing red square to identify a particularly virulent pathogen based on information in the contaminant knowledgebase.

Thus, illustrative embodiments provide one or more technical solutions that overcome a technical problem with visualization of unseen contaminants within an enclosed physical space using holographic images. As a result, these one or more technical solutions provide a technical effect and practical application in the field of holograms.

Figure 3:
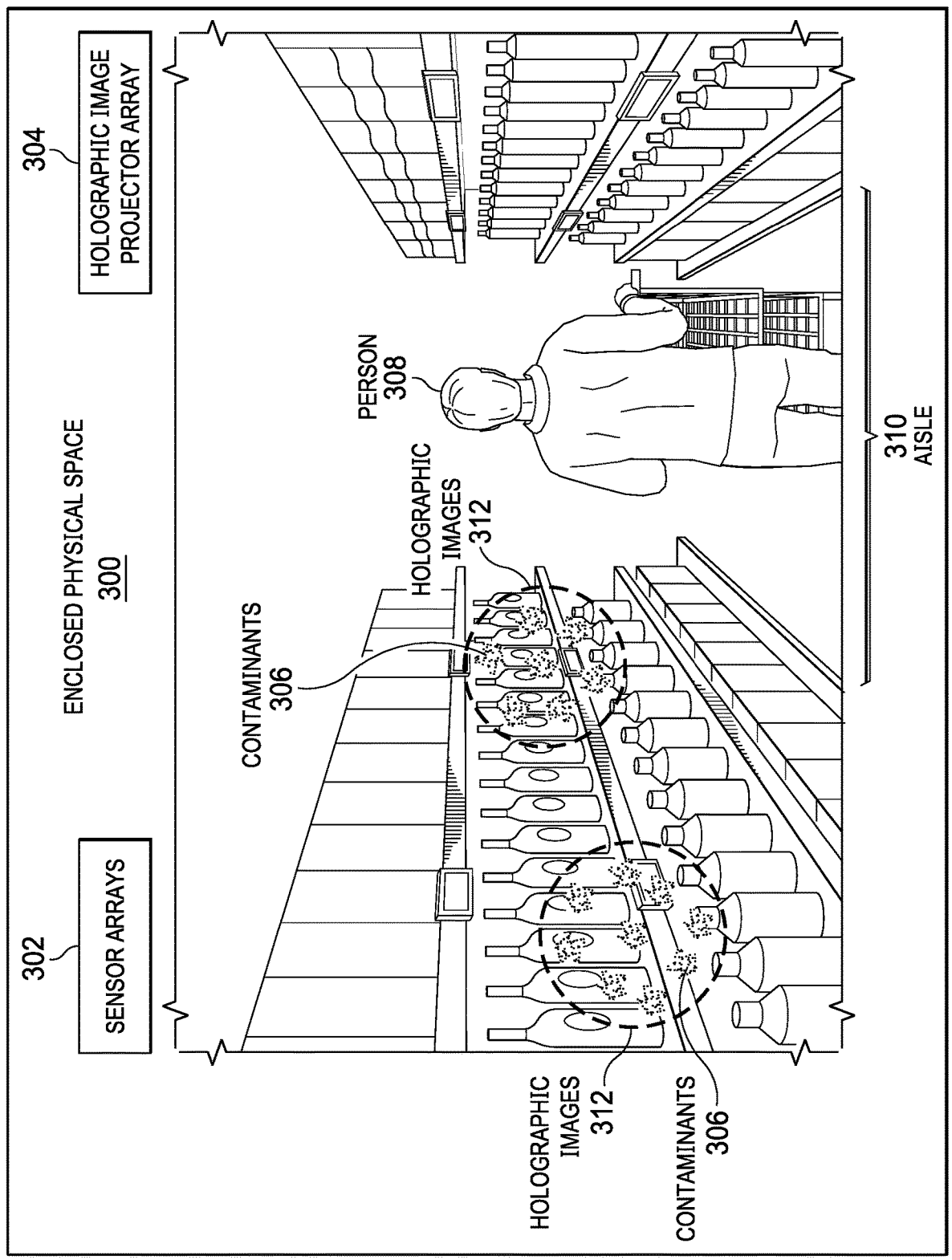
FIG. 3 is a diagram illustrating an example of an enclosed physical space in accordance with an illustrative embodiment.

With reference now to FIG. 3, a diagram illustrating an example of an enclosed physical space is depicted in accordance with an illustrative embodiment. Enclosed physical space 300 may be implemented in a network of data processing systems, such as network data processing system 100 in FIG. 1. It should be noted that enclosed physical space 300 is intended as an example only and not as a limitation on different illustrative embodiments. In other words, even though enclosed physical space 300 is shown as a store environment, enclosed physical space 300 may represent any type of enclosed physical space, such as, for example, a laboratory, a manufacturing plant, an office building, a public transportation station, an assembly floor, a school, a theater, a fitness center, a hotel, a restaurant, a house, an apartment building, a room, a vehicle, an aircraft, a ship, a submarine, a train, a subway, or the like.

In this example, enclosed physical space 300 includes sensor arrays 302 and holographic image projector array 304, such as, for example, enclosed physical space 122 including sensor arrays 110 and holographic image projector array 112 in FIG. 1. As used herein, an array is a number of items, such as sensors and projectors, arranged in a certain or defined geometric pattern within enclosed physical space 300. Sensor arrays 302 may include any number and types of sensor arrays. Sensor arrays 302 are capable of detecting and monitoring contaminants, such as contaminants 306, within enclosed physical space 300. Contaminants 306 may be, for example, dust, allergens, pathogens, certain particulates, or any combination thereof, which are defined and described in a contaminant knowledgebase, such as, for example, contaminant knowledgebase 220 in FIG. 2.

A server, such as, for example, server 104 in FIG. 1, generates a visualization of contaminants 306 using one or more of colors, shapes, markings (cross-hatching), symbols, characters, graphics, images, emojis, animations, and the like to indicate properties of contaminants 306, such as, for example, type, virulence, toxicity, exposure reaction severity, concentration, movement, and the like. When person 308 enters aisle 310 of enclosed physical space 300, the server utilizes one or more holographic image projectors of holographic image projector array 304 to project holographic images 312 of contaminants 306 in aisle 310 using the generated visualization of contaminants 306. As a result, the server enables person 308 to visualize contaminants 306 prior to person 308 coming in contact with contaminants 306 enabling person 308 to take appropriate action if desired.

Figure 4:
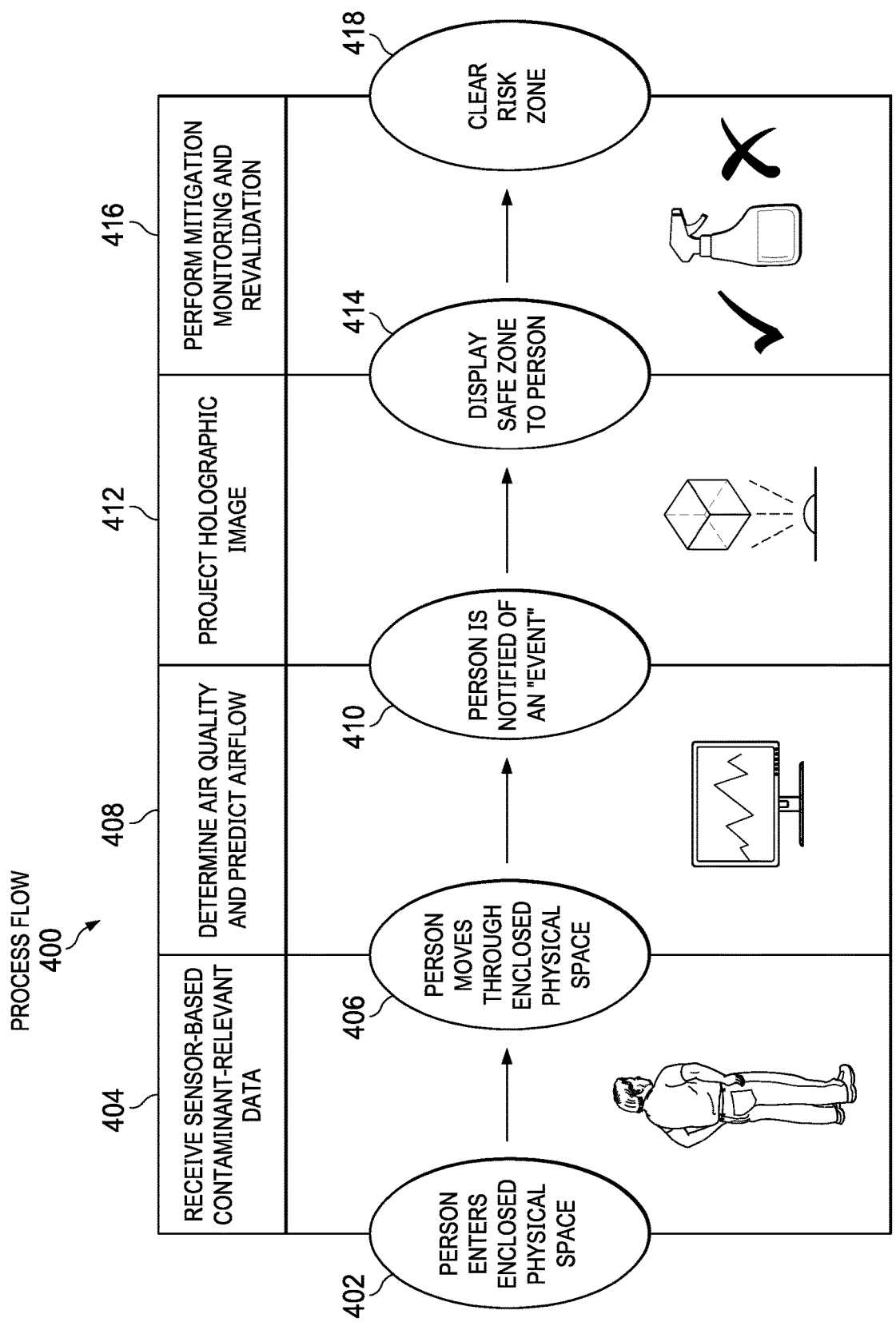
FIG. 4 is a diagram illustrating an example of a process flow in accordance with an illustrative embodiment.

With reference now to FIG. 4, a diagram illustrating an example of a process flow is depicted in accordance with an illustrative embodiment. Process flow 400 is a high-level process overview of illustrative embodiments and may be implemented in an enclosed physical space, such as, for example, enclosed physical space 300 in FIG. 3. However, it should be noted that process flow 400 is intended as an example only and not as a limitation on different illustrative embodiments. In other words, process flow 400 may include more or fewer steps than illustrated.

In this example, at 402, a person enters the enclosed physical space. At 404, a server, such as, for example, server 104 in FIG. 1 or data processing system 200 in FIG. 2, receives sensor-based contaminant-relevant data from a plurality of different sensor arrays located throughout the enclosed physical space. The plurality of different sensor arrays may be, for example, sensor arrays 302 in FIG. 3 and may include a camera sensor array, a thermal sensor array, an air quality sensor array, an airflow detection sensor array, a dust detection sensor array, a pathogen detection sensor array, a liquid detection sensor array, a vapor or droplet detection sensor array, an odor detection sensor array, and the like.

At 406, the person continues to move through the enclosed physical space. At 408, the server determines air quality and predicts airflow in the enclosed physical space based on the sensor-based contaminant-relevant data received from the plurality of different sensor arrays. At 410, the server notifies the person of an "event" that recently occurred in the enclosed physical area. The server may notify the person via a client mobile device corresponding to the person, such as, a smart phone, smart watch, smart glasses, tablet computer, or the like. The event may be, for example, detection of a contaminant, such as suspended water drops caused by another person at a particular location in the enclosed physical space coughing with an increased temperature and not wearing a facial mask, a toxic spill (e.g., pesticide, herbicide, chemicals, or the like) at a particular location in the enclosed physical space due to another person dropping a bag of the toxic material, a dust cloud at a particular location in the enclosed physical space due to movement of old inventory off shelves, or the like.

At 412, the server projects a holographic image of the contaminant at, adjacent to, or near the particular location where the contaminant is located so that the person can visualize the contaminant, along with the type, concentration, and movement of the contaminant. The server projects the holographic image using a holographic image projector array, such as, for example, holographic image projector array 304 in FIG. 3. Further, at 414, the server, using the holographic image projector array, displays a virtual boundary of a safe zone around the contaminant indicating where the person is at a determined safe distance from the contaminant, without risk of exposure to the contaminant.

At 416, the server performs mitigation monitoring and revalidation. Mitigation monitoring includes tracking in real time performance of mitigation actions steps corresponding to the contaminant to reduce or eliminate the contaminant within the enclosed physical space. It should be noted that the server may automatically initiate one or more mitigation actions steps, such as, for example, sending a contaminant alert to appropriate systems and/or individuals. For example, the server may direct an air jet array of the enclosed physical space to use columns of forced cold air around the particular location of the contaminant to isolate the contaminant and prevent the contaminant from spreading and direct ventilation system of the enclosed physical space to reverse airflow at that particular location of the contaminant to extract the contaminant. In addition to, or instead of, directing other systems of the enclosed physical space, the server may direct responsible personnel regarding the contaminant. The server also performs revalidation of the particular location of the contaminant based on the mitigation monitoring. At 418, the sever clears the risk zone corresponding to the contaminant based on revalidation of the location of the contaminant.

Figure 5B:
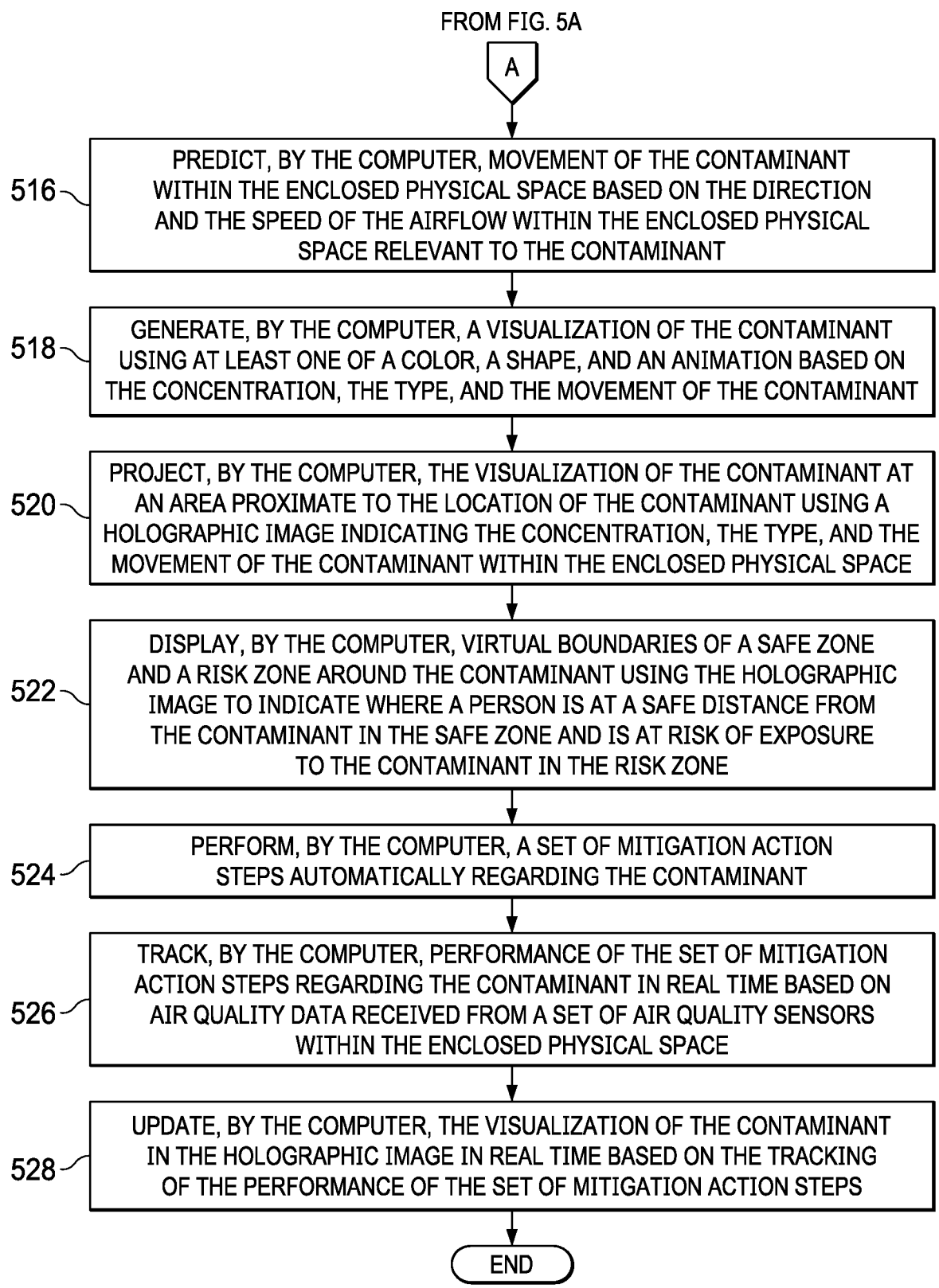

With reference now to FIGS. 5A-5B, a flowchart illustrating a process for visualizing a contaminant is shown in accordance with an illustrative embodiment. The process shown in FIGS. 5A-5B may be implemented in a computer, such as, for example, server 104 in FIG. 1 or data processing system 200 in FIG. 2. For example, the process shown in FIGS. 5A-5B may be implemented in contaminant manager 218 in FIG. 2.

The process begins when the computer monitors an enclosed physical space using a plurality of different sensor arrays (step 502). The computer receives contaminant-relevant data from one or more sensors of the plurality of different sensor arrays regarding the enclosed physical space via a network (step 504). The computer performs an analysis of the contaminant-relevant data received from the one or more sensors of the plurality of different sensor arrays regarding the enclosed physical space using information included in a contaminant knowledgebase containing definitions and corresponding properties of a plurality of different contaminants (step 506).

The computer identifies a contaminant of the plurality of different contaminants included in the contaminant knowledgebase based on the analysis of the contaminant-relevant data received from the one or more sensors of the plurality of different sensor arrays regarding the enclosed physical area (step 508). In addition, the computer identifies a concentration and a type of the contaminant based on the contaminant-relevant data and the information included in the contaminant knowledgebase (step 510). Further, the computer identifies a location of the contaminant within the enclosed physical space based on location of the one or more sensors that obtained the contaminant-relevant data and a digital twin of the enclosed physical space (step 512). Furthermore, the computer identifies a direction and a speed of airflow within the enclosed physical space relevant to the contaminant based on airflow data corresponding to the enclosed physical space (step 514).

The computer predicts movement of the contaminant within the enclosed physical space based on the direction and the speed of the airflow within the enclosed physical space relevant to the contaminant (step 516). The computer generates a visualization of the contaminant using at least one of a color, a shape, and an animation based on the concentration, the type, and the movement of the contaminant (step 518). The computer projects the visualization of the contaminant at an area proximate to the location of the contaminant using a holographic image indicating the concentration, the type, and the movement of the contaminant within the enclosed physical space (step 520). The computer also displays virtual boundaries of a safe zone and a risk zone around the contaminant using the holographic image to indicate where a person is at a safe distance from the contaminant in the safe zone and is at risk of exposure to the contaminant in the risk zone (step 522).

The computer automatically performs a set of mitigation action steps regarding the contaminant (step 524). The computer tracks performance of the set of mitigation action steps regarding the contaminant in real time based on air quality data received from a set of air quality sensors (step 526). The computer updates the visualization of the contaminant in the holographic image in real time based on tracking the performance of the mitigation action steps (step 528). Thereafter, the process terminates.

Thus, illustrative embodiments of the present invention provide a computer-implemented method, computer system, and computer program product for generating a holographic image of contaminants in an enclosed physical space to visualize the contaminants, along with a type, concentration, and movement of the contaminants. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for visualizing a contaminant, the computer-implemented method comprising:

identifying, by a computer, a contaminant of a plurality of different contaminants included in a contaminant knowledgebase based on analysis of contaminant-relevant data received from one or more sensors of a plurality of different sensor arrays regarding an enclosed physical space;

identifying, by the computer, a concentration and a type of the contaminant based on the contaminant-relevant data and information included in the contaminant knowledgebase;

identifying, by the computer, a location of the contaminant within the enclosed physical space based on location of the one or more sensors that obtained the contaminant-relevant data and a digital twin of the enclosed physical space; and projecting, by the computer, a visualization of the contaminant at an area proximate to the location of the contaminant using a holographic image indicating the concentration and the type of the contaminant within the enclosed physical space.

2. The computer-implemented method of claim 1 further comprising:

identifying, by the computer, a direction and a speed of airflow within the enclosed physical space relevant to the contaminant based on airflow data corresponding to the enclosed physical space;

predicting, by the computer, movement of the contaminant within the enclosed physical space based on the direction and the speed of the airflow within the enclosed physical space relevant to the contaminant; and projecting, by the computer, the visualization of the contaminant at the area proximate to the location of the contaminant using the holographic image indicating the movement of the contaminant within the enclosed physical space.

3. The computer-implemented method of claim 2 further comprising:

generating, by the computer, the visualization of the contaminant using at least one of color, shape, and animation based on the concentration, the type, and the movement of the contaminant.

4. The computer-implemented method of claim 1 further comprising:

displaying, by the computer, virtual boundaries of a safe zone and a risk zone around the contaminant using the holographic image indicate where a person is at a safe distance from the contaminant in the safe zone and is at risk of exposure to the contaminant in the risk zone.

5. The computer-implemented method of claim 1 further comprising:

performing, by the computer, a set of mitigation action steps automatically regarding the contaminant.

6. The computer-implemented method of claim 5 further comprising:

tracking, by the computer, performance of the set of mitigation action steps regarding the contaminant in real time based on air quality data received from a set of air quality sensors within the enclosed physical space; and updating, by the computer, the visualization of the contaminant in the holographic image in real time based on the tracking of the performance of the set of mitigation action steps.

7. The computer-implemented method of claim 5, wherein the set of mitigation action steps includes the computer, via defined application programming interfaces, automatically connecting to and controlling one or more systems of the enclosed physical space to at least one of isolate the contaminant and eliminate the contaminant from the enclosed physical space.

8. The computer-implemented method of claim 1 further comprising:

monitoring, by the computer, the enclosed physical space using the plurality of different sensor arrays;

receiving, by the computer, the contaminant-relevant data from one or more sensors of the plurality of different sensor arrays regarding the enclosed physical space via a network; and performing, by the computer, an analysis of the contaminant-relevant data received from the one or more sensors of the plurality of different sensor arrays regarding the enclosed physical space using the information included in the contaminant knowledgebase containing definitions and properties of the plurality of different contaminants.

9. The computer-implemented method of claim 1, wherein the contaminant is at least one of dust, particulate, allergen, pathogen, and toxic material.

10. A computer system for visualizing a contaminant, the computer system comprising:

a bus system;

a storage device connected to the bus system, wherein the storage device stores program instructions; and a processor connected to the bus system, wherein the processor executes the program instructions to:

identify a contaminant of a plurality of different contaminants included in a contaminant knowledgebase based on analysis of contaminant-relevant data received from one or more sensors of a plurality of different sensor arrays regarding an enclosed physical space;

identify a concentration and a type of the contaminant based on the contaminant- relevant data and information included in the contaminant knowledgebase;

identify a location of the contaminant within the enclosed physical space based on location of the one or more sensors that obtained the contaminant-relevant data and a digital twin of the enclosed physical space; and project a visualization of the contaminant at an area proximate to the location of the contaminant using a holographic image indicating the concentration and the type of the contaminant within the enclosed physical space.

11. The computer system of claim 10, wherein the processor further executes the program instructions to:

identify a direction and a speed of airflow within the enclosed physical space relevant to the contaminant based on airflow data corresponding to the enclosed physical space;

predict movement of the contaminant within the enclosed physical space based on the direction and the speed of the airflow within the enclosed physical space relevant to the contaminant; and project the visualization of the contaminant at the area proximate to the location of the contaminant using the holographic image indicating the movement of the contaminant within the enclosed physical space.

12. The computer system of claim 11, wherein the processor further executes the program instructions to:

generate the visualization of the contaminant using at least one of color, shape, and animation based on the concentration, the type, and the movement of the contaminant.

13. The computer system of claim 10, wherein the processor further executes the program instructions to:
    display virtual boundaries of a safe zone and a risk zone around the contaminant using the holographic image indicate where a person is at a safe distance from the contaminant in the safe zone and is at risk of exposure to the contaminant in the risk zone.

14. The computer system of claim 10, wherein the processor further executes the program instructions to:
    perform a set of mitigation action steps automatically regarding the contaminant.

15. A computer program product for visualizing a contaminant, the computer program product comprising a non-transitory computer readable storage medium having program instructions embodied therewith, the program instructions executable by a computer to cause the computer to perform a method of:
    identifying, by the computer, a contaminant of a plurality of different contaminants included in a contaminant knowledgebase based on analysis of contaminant-relevant data received from one or more sensors of a plurality of different sensor arrays regarding an enclosed physical space;
    identifying, by the computer, a concentration and a type of the contaminant based on the contaminant-relevant data and information included in the contaminant knowledgebase;
    identifying, by the computer, a location of the contaminant within the enclosed physical space based on location of the one or more sensors that obtained the contaminant-relevant data and a digital twin of the enclosed physical space; and
    projecting, by the computer, a visualization of the contaminant at an area proximate to the location of the contaminant using a holographic image indicating the concentration and the type of the contaminant within the enclosed physical space.

16. The computer program product of claim 15 further comprising:
    identifying, by the computer, a direction and a speed of airflow within the enclosed physical space relevant to the contaminant based on airflow data corresponding to the enclosed physical space;
    predicting, by the computer, movement of the contaminant within the enclosed physical space based on the direction and the speed of the airflow within the enclosed physical space relevant to the contaminant; and
    projecting, by the computer, the visualization of the contaminant at the area proximate to the location of the contaminant using the holographic image indicating the movement of the contaminant within the enclosed physical space.

17. The computer program product of claim 16 further comprising:
    generating, by the computer, the visualization of the contaminant using at least one of color, shape, and animation based on the concentration, the type, and the movement of the contaminant.

18. The computer program product of claim 15 further comprising:
    displaying, by the computer, virtual boundaries of a safe zone and a risk zone around the contaminant using the holographic image indicate where a person is at a safe distance from the contaminant in the safe zone and is at risk of exposure to the contaminant in the risk zone.

19. The computer program product of claim 15 further comprising:
    performing, by the computer, a set of mitigation action steps automatically regarding the contaminant.

20. The computer program product of claim 19 further comprising:
    tracking, by the computer, performance of the set of mitigation action steps regarding the contaminant in real time based on air quality data received from a set of air quality sensors within the enclosed physical space; and
    updating, by the computer, the visualization of the contaminant in the holographic image in real time based on the tracking of the performance of the set of mitigation action steps.

* * * * *